United States Patent [19]
Freyermuth et al.

[11] Patent Number: 5,957,639
[45] Date of Patent: Sep. 28, 1999

[54] HOLLOW CONE DEVICE FOR GRIPPING ATTACHMENTS

[75] Inventors: Alain Freyermuth, Pfaffenhoffen; Raymond Tugend, Uberach, both of France

[73] Assignee: E.P.B. Emile Pfalzgraf (Societe Anonyme), Bouxwiller, France

[21] Appl. No.: 08/940,382

[22] Filed: Sep. 30, 1997

[30] Foreign Application Priority Data

Oct. 4, 1996 [FR] France ................................. 96 12276

[51] Int. Cl.$^6$ ..................................................... B23C 1/00
[52] U.S. Cl. ........................ 409/232; 408/239 R; 409/234
[58] Field of Search ................................. 409/232, 234; 279/56, 34; 408/238, 239 A, 239 R, 240

[56] References Cited

U.S. PATENT DOCUMENTS

| | | | |
|---|---|---|---|
| 4,850,765 | 7/1989 | Ramunas | 409/232 |
| 5,257,884 | 11/1993 | Stolz et al. | 409/232 |
| 5,466,102 | 11/1995 | Erickson | 409/232 |
| 5,697,740 | 12/1997 | Von Haas et al. | 409/234 |

FOREIGN PATENT DOCUMENTS

| | | | |
|---|---|---|---|
| 275441 | 7/1988 | European Pat. Off. | 409/234 |
| 0 488 361 | 6/1992 | European Pat. Off. | |
| 275426 | 1/1990 | Germany | 409/232 |
| 92 12 205 | 1/1993 | Germany | |
| 2154481 | 9/1985 | United Kingdom | 409/232 |

*Primary Examiner*—Daniel W. Howell
*Assistant Examiner*—Christopher Kirkman
*Attorney, Agent, or Firm*—Young & Thompson

[57] ABSTRACT

A hollow cone device for gripping attachments, essentially constituted by a bit-carrying socket (1) for blocking the member (2) to be fixed, prolonged by a securement element (3) in a support (4), such as a spindle or the like. The securement element is in the form of a screw-threaded element connected to the socket (1) and screwed into the support (4). The bit-carrying socket (1) comprises two radial recesses extending perpendicularly to its axis and in which are mounted two gripping bits (5) actuated simultaneously, to slide radially in a symmetrical manner, by a screw (6) maintained in translation by a stud screw (7) co-acting with a circular throat provided in the central region of the screw (6). An ejector (12) is guided in translation in a bore in the bit-carrying socket (1) and actuated by symmetrical pressure of the bits (5). The device also includes an element (15) for relative angular displacement between the bit-carrying socket (1) and the screw-threaded element.

10 Claims, 2 Drawing Sheets

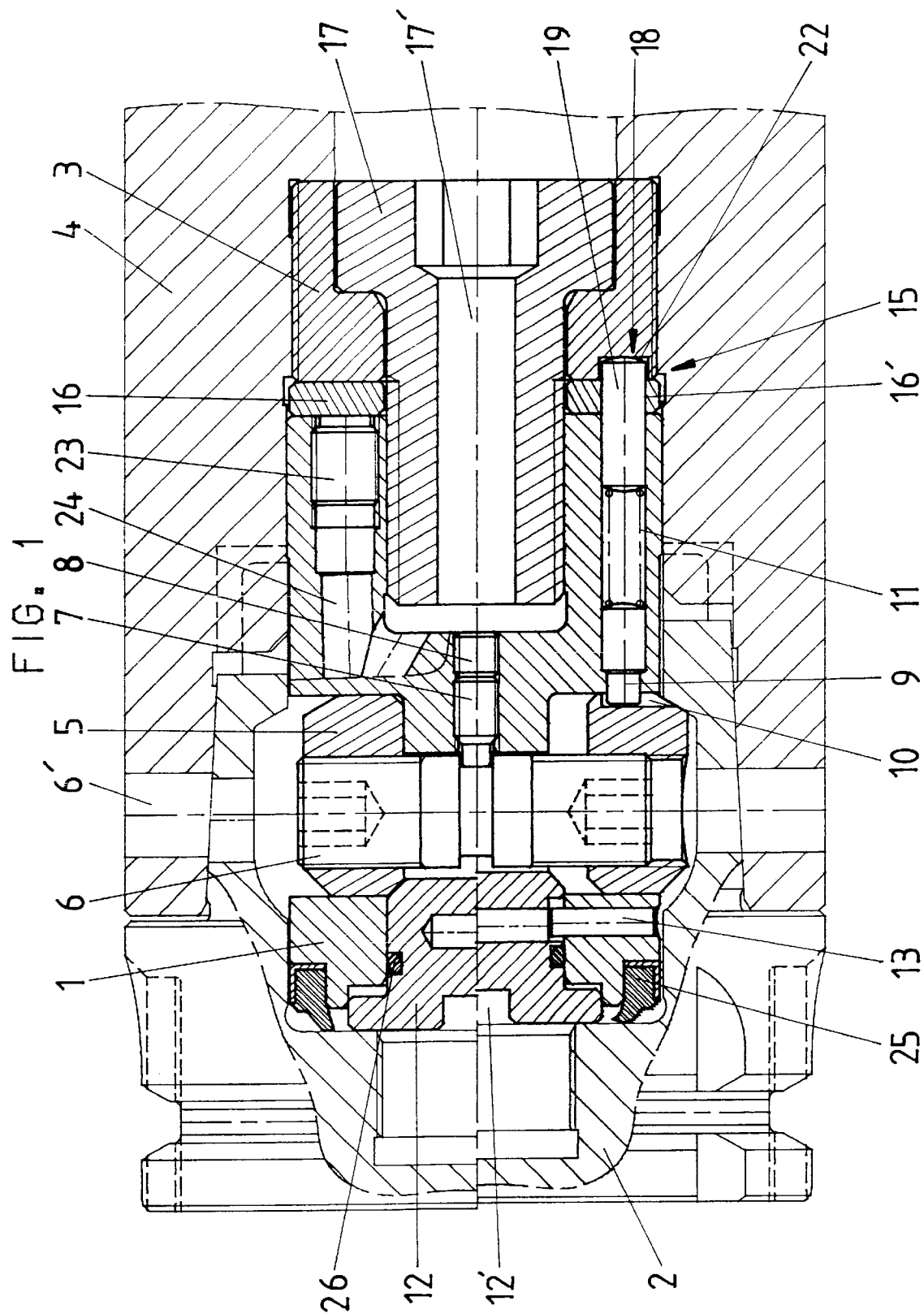

HOLLOW CONE DEVICE FOR GRIPPING ATTACHMENTS

FIELD OF THE INVENTION

The present invention relates to the field of machine tool accessories, particularly numerically controlled machines, machining centers, transfer machines or lines, and flexible cells or work stations, particularly the gripping of attachments or the like in spindles of such machines, and has for its object a hollow cone device for gripping attachments adapted to this end.

BACKGROUND OF THE INVENTION

There exist at present various devices permitting the gripping of tool holders and tools provided with hollow cone securement means. These known devices are generally actuated laterally or from the rear and require corresponding access, such that their mounting on all the configurations of spindles or other connections to machines or tool holders is not practically possible.

There is also known securement means for such devices with a bayonet coupling, however this latter does not guarantee absolute safety and reliability as to gripping and positioning. However, for the securement of such attachments, precision of positioning as well as a guarantee against coming ungripping during use, are indispensable qualities.

SUMMARY OF THE INVENTION

The present invention has for its object to overcome these drawbacks by providing a hollow cone gripping device for attachments permitting mounting of said attachments from the front, without any other intervention, as well as their unmounting.

To this end, the hollow cone gripping device for attachments, which is essentially constituted by a bit-carrying socket, for blocking the piece to be fixed, prolonged by securement means in a support, is characterized in that it is provided with a connection means having the possibility of relative rotation between the bit-carrying socket and the securement means in a support.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 1 is a view in two half sections of the devices according to the invention;

DETAILED DESCRIPTION OF THE INVENTION

Figure 3:
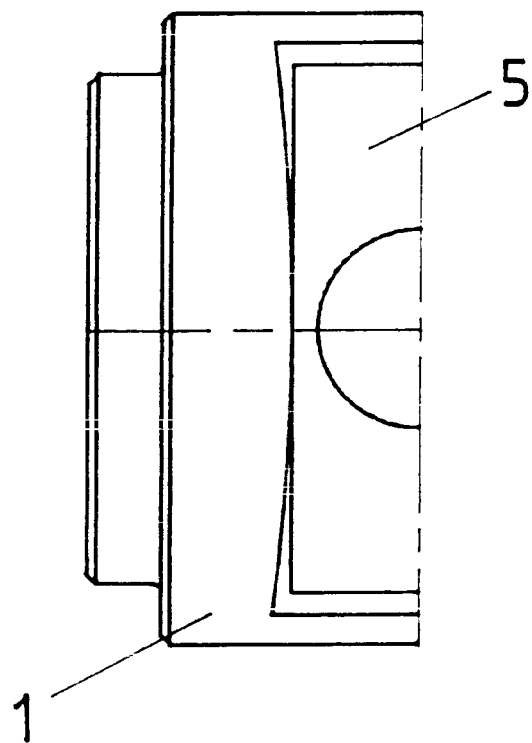
FIG. 3 is a fragmentary side elevational view of the end of the blocking bit-carrying socket.

FIG. 1 of the accompanying drawings shows by way of example a hollow cone device for gripping attachments, which is essentially constituted by a bit-carrying socket for blocking the member 2 to be fixed, prolonged by securement means in a support 4, such as a spindle or the like.

In known manner, the bit-carrying socket 1 comprises two radial recesses extending perpendicularly to its axis and in which are mounted two gripping bits 5 actuated simultaneously to slide radially in a symmetrical manner, by a screw 6 that can have a construction with a differential pitch or a reverse pitch, this screw 6 being maintained in translation by means of a stud screw 7 coacting with a circular throat provided in the central region of the screw 6. This stud screw 7 is blocked in service position by a screw 8. The control of the screw 6 takes place via piercings 6' of the support 4, diametrically opposed.

The gripping bits 5 carry out the blocking of the member 2 to be fixed by means of their external beveled surface coming into contact, in service position, with the internal conical portion of said member 2. Such a service position is shown by the lower portion of FIG. 1, in which the bit 5, displaced outwardly relative to the longitudinal axis of the device, bears by its right beveled edge against the internal conical surface of the member 2.

So as to avoid complete dismounting of the bit 5 from the screw 6 so that it will fall during manipulations of gripping and ungripping, there is provided also in a known manner, to limit their path of movement by means of a pin 9 coacting with a groove 10 and one of the gripping bits 5. This pin is preferably loaded by a spring 11 permitting its retraction during mounting of the corresponding bit 5.

In the case of displacement of the bit 5 by means of the screw 6, these latter are guided in the bit-carrying socket 1 and are maintained in equilibrium by the force transmitted by the screw 6 and the reaction of the guide surfaces of the socket 1 as well as by the reaction forces of the fixed member 2.

Such a gripping device for attachments is provided moreover with an ejector 12, guided in translation in a bore of the bit-carrying socket 1 and adapted to free the fixed member 2 by symmetrical pressure on this latter, so as to avoid any problem of buttressing during ungripping of the device, a pin 13 ensuring stopping in rotation and limiting the path of said ejector 12. The ejection operation is carried out by the screw 6 which, during ungripping, by provoking the re-entry of the two gripping bits 5, places the internal inclined surfaces of said bits 5 into contact with the corresponding surfaces of the surface of the ejector 12 opposite the ejection surface.

The securement means 3 in a support 4, such as a spindle or the like, prolonging the bit-carrying socket 1 for blocking the member 2 to be secured, is essentially in the form of a screw-threaded element connected to said socket 1 and screwed into the support 4. This screw-threaded element will be indicated hereafter by the same reference numeral 3.

According to the invention, the attachment gripping device is provided with means 15 for relative angular displacement between the bit-carrying socket and the screw-threaded element forming the means 3 for securement in a support 4. This means 15 for relative angular displacement between the bit-carrying socket 1 and the means 3 for securement in a support 4, is preferably constituted by a ring 16, interposed between the screw-threaded element forming the securement means 3 of the device in the support 4 and said socket 1, by an axial assembly screw 17 for said screw-threaded element 3 and the ring 16 on the bit-carrying ring 1 and by at least one irreversible means 18 driving in rotation the screw-threaded element forming the means 3 for securement of the device in the support 4, in the ungripping direction of this latter, by the bit-carrying socket 1.

The axial screw 17 is gripped in the bit-carrying socket 1 with a predetermined gripping couple, corresponding to the minimum gripping couple necessary for the securement in the support 4, and is finally fixed to said bit-carrying socket 1 by cementing or by means of a radial screw or any other assembly means.

The ring 16 is provided with at least one and preferably several holes 16' for passage of a pin 19, forming a retractable drive and mounted resiliently displaceably against the action of a compression spring, in a longitudinal recess corresponding to the bit-carrying socket 1. The ring 16 is preferably provided with at least two holes 16' diametrically opposed for two pins 19 mounted in the bit-carrying socket 1. In the embodiment shown in FIG. 1 of the accompanying drawings, the receiving of at least one pin 19 is carried out in a prolongation of that of the pin 9 for retaining the gripping bit 5, the actuating spring 11 of said pin 9 forming simultaneously the return spring for the pin 19.

Figure 2:
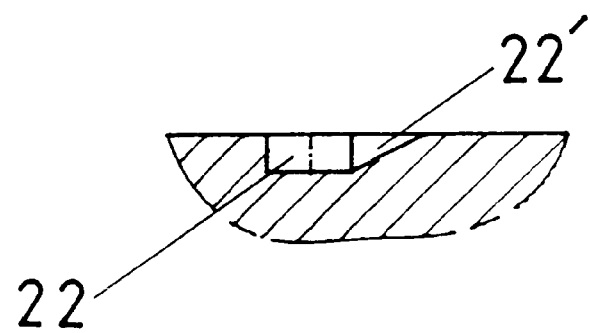
FIG. 2 is a fragmentary view on a larger scale, of a snap-in recess for retractable drivers of the relative angular displacement means.

The surface of the screw-threaded element forming the means 3 for securement of the device in the support 4, which is turned toward the ring 16, is provided at regular intervals with openings 22 each forming a snap-in recess for a retractable drive constituted by a pin 19 and having, in the direction of its gripping in the support 4, an outlet ramp 22' (FIG. 2) opening on said surface, the assembly of pin 19 and holes 22 forming the irreversible means 18 for driving in rotation the screw-threaded element 3 in the unlocking direction. Thus, because of the free rotation for the screw-threaded element forming the means 3 for securement of the device in the support 4, so as to develop a minimum rotative couple, it is possible to carry out the rotation of the bit-carrying socket 1, after obtaining the necessary gripping in the support 4, determined by the gripping couple of the axial screw 17, the pin or pins 19 sliding on the output ramp or ramps 22'.

As a result, the device according to the invention can be perfectly positioned in the support 4, particularly such that the axis of its screw 6 for actuating the bits 5 will be aligned with that of the holes 6' of the support 4, thereby permitting control of said screw 6 by means of a lateral access tool authorizing gripping or ungripping of the connection of the member 2 to be fixed.

After ensuring the positioning of the bit-carrying socket 1 relative to the support 4 and to the screw-threaded element forming the means 3 for securement of the device in the support 4, after its regulation, there is provided according to another characteristic of the invention, at least one blocking screw 23 for the bit-carrying socket 1, maneuverable through a longitudinal hole 24 in said socket 1 extending outside the plane passing through the axis of the screw 6 for manipulating the bit 5. In FIG. 1 of the accompanying drawing, the screw 23 and the corresponding hole 24 are shown in partial cross-section offset relative to the plane of the upper half cup. This screw 23 thus permits, once the final position is reached, by simple screwing from the front with a predetermined couple, obtaining a flattening force between the ring 16 and the screw-threaded element forming the means 3 for securement of the device in the support 4 and, because of this, eliminating the degree of freedom in rotation of the bit-carrying socket 1.

During adjustment of the position of the bit-carrying socket 1 in the support 4, the pin or pins 19, forming retractable drives, will pass through the openings 22, each forming a snap-in recess for a retractable drive, snapping behind each mounting of the ramp 22' to permit rotation of said bit-carrying socket without encumberment. On the contrary, during ungripping, the direction of rotation is reversed and the pins 19 will again fall into the openings 22, which thus form abutments, such that the device can be ungripping. However, ungripping will require preliminary ungripping of the blocking screw or screws 23, thereby freeing the rotation between the bit-carrying socket 1 and the screw-threaded element forming the means 3 for securement of the device in the support 4.

According to another characteristic of the invention, and as shown more particularly in FIG. 3 of the accompanying drawings, the lateral guidance of the gripping bits 5 in the radial recesses of the bit-carrying socket 1, from the application side in the recesses opposite to that of application of the bit 5 in the member 2 to be fixed, is a linear guidance obtained by coaction between a lateral flat surface and a corresponding waisted surface. In the illustrated embodiment, the recess for the bit-carrying socket 1 is provided with a waisted surface, adjacent the end of the bit-carrying socket 1, whilst the corresponding surface of the bit 5 is flat. However, it is also possible to provide a reverse coaction of the surfaces.

Such an embodiment permits the possibility of pivoting the bits 5 relative to the axis of the screw 6 and hence an adaptation of their positioning to the configuration of the internal gripping surface of the member 2 to be fixed. As a result, the application of the bits against said internal surfaces will be more complete and the blockage of the member 2 will be improved.

According to another characteristic of the invention, the hollow cone gripping device for attachments is provided moreover with a central lubrication means constituted by a central hole 17' through the axial screw 17 for assembly of the screw-threaded element forming the means 3 for securement of the device in the support 4 and the ring 16 on the bit-carrying socket 1, opening into the bottom of the recess of this latter in said socket 1, and by connection channels for this recess with the forward surface of the socket 1 and with a transverse channel 12' of the ejector 12, a peripheral joint 25 being provided in the end of the bit-carrying socket 1 bearing against the rear surface of the member 2 to be fixed and the sealing between the ejector 12 and said end of the bit-carrying socket 1 being ensured by a joint 26. Thus, the lubricant is prevented from penetrating into the movable portion comprised by the screw 6 and the bits 5, on the one hand, through the interior between the bit-carrying socket 1 and the ejector 12 through the joint 26 and, on the other hand, from the outside between the bit-carrying socket 1 and the member 2 to be fixed by the joint 25.

Of course, the invention is not limited to the embodiment described and shown in the accompanying drawings. Modifications remain possible, particularly as to the construction of the various elements or by substitution of technical equivalents, without thereby departing from the scope of protection of the invention.

We claim:

1. Hollow cone device for gripping attachments, comprising a bit-carrying socket for blocking a member to be secured, extended by means for securement in a support, said means for securement comprising a screw-threaded element connected to the bit-carrying socket and screwed into the support, the bit-carrying socket having two radial recesses extending perpendicularly to its axis and in which are mounted two gripping bits actuated simultaneously, to slide radially in a symmetrical manner, by a first screw maintained in translation by means of a stud screw co-acting with a circular throat provided in a central region of the first screw, an ejector guided in translation in a bore of the bit-carrying socket and actuated by symmetrical pressure of the gripping bits, and means for relative angular displacement between the bit-carrying socket and the screw-threaded element.

2. Device according to claim 1, wherein the means for relative angular displacement comprises a ring interposed between the screw-threaded element and the bit-carrying socket; an axial screw for assembly of said screw-threaded element and the ring on the bit-carrying socket; and at least one irreversible means for driving the screw-threaded element in rotation in an ungripping direction of the support by the bit-carrying socket.

3. Device according to claim 2, wherein the axial screw is gripped in the bit-carrying socket with a predetermined gripping couple, corresponding to the minimum gripping couple necessary for securement in the support, and is finally secured to said bit-carrying socket by one of cementing, a radial screw and any other assembly means.

4. Device according to claim 2, wherein the ring is provided with at least one hole for passage of a pin, forming a retractable drive and mounted resiliently displaceably against the action of a compression spring, in a longitudinal recess formed in the bit-carrying socket.

5. Device according to claim 2, wherein a surface of the screw-threaded element which is turned toward the ring, is provided at regular intervals with openings, each forming a snap-in recess for a retractable drive constituted by a pin and having in the direction of gripping in the support, an outlet ramp opening onto said surface, the pin and openings together constituting the irreversible means.

6. Device according to claim 2, wherein the bit-carrying socket is provided with at least one blocking screw manipulable through a longitudinal hole in said socket extending outside a plane passing through the axis of the first screw for manipulating the bits.

7. Device according to claim 2, further comprising central lubrication means constituted by a central hole of the axial screw for assembly of the screw-threaded element and of the ring, said central hole opening into the bottom of the bit-carrying socket; connection channels with a front surface of the socket and a transverse channel of the ejector; a peripheral joint being disposed on the end of the bit-carrying socket bearing against a rear surface of the member to be secured; and a sealing joint between the ejector and the end of the bit-carrying socket.

8. Device according to claim 1, wherein the gripping bits are laterally and linearly guided in the radial recesses of the bit-carrying socket by coaction between a lateral flat surface and a corresponding waisted surface.

9. Device according to claim 8, wherein each recess is provided with a waisted surface, adjacent the end of the bit-carrying socket, while the corresponding surface of each gripping bit is flat.

10. Device according to claim 8, wherein each recess is provided with two opposite parallel surfaces, while each gripping bit has on the side opposite the end of the bit-carrying socket, a waisted surface.

\* \* \* \* \*